Dec. 22, 1964 SYOICHI FURUYA 3,162,376
WATER-TIGHT PORTABLE ELECTRIC LAMP FOR UNDER-WATER USE
Filed Nov. 5, 1962 3 Sheets-Sheet 1

INVENTOR.
SYOICHI FURUYA
BY McGlew and Toren
ATTORNEYS

Dec. 22, 1964  SYOICHI FURUYA  3,162,376
WATER-TIGHT PORTABLE ELECTRIC LAMP FOR UNDER-WATER USE
Filed Nov. 5, 1962  3 Sheets-Sheet 3

INVENTOR.
SYOICHI FURUYA
BY
Attorneys

United States Patent Office 3,162,376
Patented Dec. 22, 1964

3,162,376
WATER-TIGHT PORTABLE ELECTRIC LAMP
FOR UNDER-WATER USE
Syoichi Furuya, 6 Misono 3–chome Ota-ku, Tokyo, Japan
Filed Nov. 5, 1962, Ser. No. 235,428
4 Claims. (Cl. 240—10.66)

This invention relates to a water-tight portable electric lamp chiefly for under-water use. It relates especially to a water-tight portable electric lamp whose switch can be magnetically operated from the outside of said electric lamp.

In one known type of a water-tight portable electric lamp for underwater use, one or more dry electric cells, an electric lamp bulb with a reflector, a light-condenser lens, and an electric switch are contained in a portable casing; the operating head of said switch is mounted on the outside of said casing; the portable electric lamp thus composed is covered with a comparatively thin envelope made of flexible material such as rubber, etc. except the light-projecting area i.e. a section of the surface of said light condenser lens; and the operation of said switch is effected from the outside of the envelope. But, as there intervenes a part of the envelope, for example, a layer of rubber, between the operating hand and the operating head of the switch, smooth switch operation is difficult to obtain, and water-tightness is subject to damage by repeated use of switch and replacement of cells.

In another known type of under-water lamp, wherein a part of the conductor metal of the switch is embedded in the wall of an enclosed casing made of synthetic resin, and another part of said metal is exposed on the outside of said wall, while an operating member is associated to said exposed part, there is an inconvenience that the water-tightness of the casing is subject to damage owing to the corrosion of the conductor metal of the switch positioned on the outside of the casing. Said portable lamp has another inconvenience that more work is required for the fabrication of the operating part of the switch.

In still another known type of under-water lamps, wherein an electric switch operating device mounted on a part of the outer surface of the casing wall is covered water-tightly with a thin flexible layer of synthetic resin attached to the outer surface of said casing wall, and switch operating force is applied from the outside of said layer, the attached part of said layer is subject to damage in use, and, where water temperature is low, the decrease of flexibility of said layer hinders sometimes smooth switch operation.

One object of this invention is to provide a water-tight portable electric lamp free of the above-mentioned inconveniences proper to the devices of known type, with water-tightness assured and smooth switch operation maintained.

Another object of this invention is to provide a water-tight portable electric lamp whose switch operation can be effected without providing any mechanical connection between a switch operating movable metal piece placed inside of a water-tight casing and a switch operating member placed on the outside of said casing.

Another object of this invention is to provide a water-tight portable electric lamp, wherein, one or more dry electric cells, an electric lamp bulb, a reflector, a light condenser lens, and an electrical contactor controlling an electric circuit between said cells and said bulb, are placed inside of a water tight enclosing casing made of magnetically permeable material, while magnetic interaction can be produced between a magnetic body or permanent magnet mounted on a movable part of said contactor and a permanent magnet mounted on an operating member slidable along the outside of the casing.

A preferred embodiment of the present invention is represented in the accompanying drawings, in which.

Figure 1:
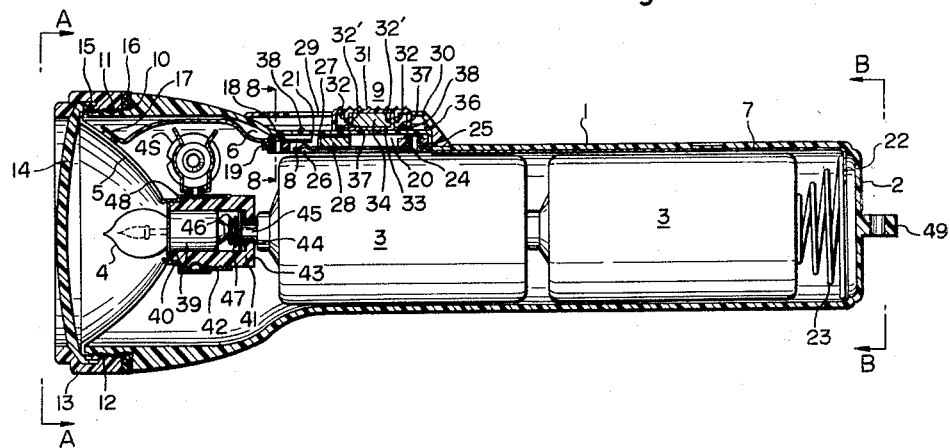
FIG. 1 is a longitudinal side view, partly in section, of a water-tight portable electric lamp according to the present invention.
Figure 2:
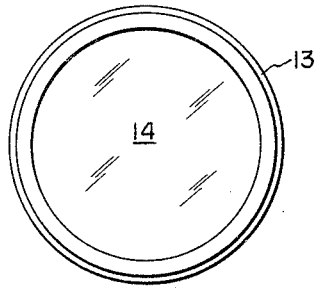
FIG. 2 is a front view along line A—A in FIG. 1.
Figure 3:
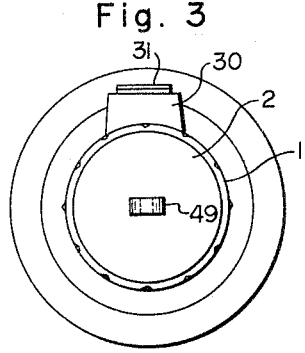
FIG. 3 is a back view along line B—B in FIG. 1.
Figure 4:
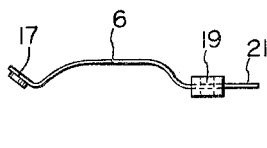
FIG. 4 is a side view of a front conductor plate and its securing member.
Figure 5:
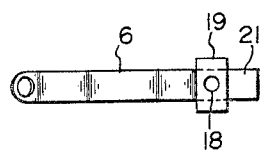
FIG. 5 is a plan view of FIG. 4.
Figure 6:
FIG. 6 is a side view of a rear conductor plate and its securing member.
Figure 7:
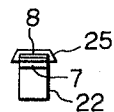
FIG. 7 is an end view of FIG. 6.

As shown in FIGS. 1–3 of the accompanying drawings, a water-tight portable electric lamp according to one embodiment of the present invention comprises, as basic components, a cylindrical casing 1 with bottom 2 containing dry cells 3, 3 (of which any suitable number may be provided), an electric lamp bulb 4, a light-reflecting dish-like metal plate 5 constituting a reflector, front and rear conductor plates 6 and 7, an electric contactor 8 positioned between said plates, and a switch-operating head 9 mounted on the outside of said cylindrical casing 1. It is similar to prior art portable electric lamps in this respect, but, in order to make said cylindrical casing 1 watertight and, furthermore, to operate said electric contactor 8 magnetically from the outside of said casing 1, special constructions are provided as described hereinafter.

Said casing 1, having a substantially cylindrical shape, is moulded from a magnetically permeable material, for example synthetic resin, so as to have an integral bottom 2 or back end, and provided with a shoulder or a step 10 and a screw thread 11 on the outer surface near the front end. A front ring 13 made of synthetic resin is provided with an internal screw thread 12 which engages with said screw thread 11. A transparent condenser lens 14 made of synthetic resin is secured water-tightly to said front ring 13 by embedding a peripheral skirt edge 15 of said lens 14 into said ring 13 (during the moulding of the ring 13). A packing ring 16 made of rubber, for example, is fitted on the step or shoulder 10, and when screwing the front ring 13 to the front end of said casing, said packing ring 16 is compressed between the shoulder 10 and the rear end of the front ring 13, whereby the casing 1 is water-tightly enclosed.

Figure 8:
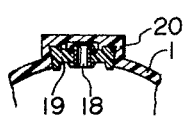
FIG. 8 is a partial sectional view taken along the line 8—8 in FIG. 1.

Said front conductor plate 6, made of electrically conductive metal, has its front end 17 resiliently pressed against the back surface of the reflecting plate 5 made of electrically conductive metal. In a position adjacent to the rear end of said front conductor plate 6 is secured, by an eyelet 18, a securing member 19 having wedge-like or dovetail sectional shape and made of synthetic resin, inserting which into the front end of a mating key-way 20 extending longitudinally in the inner side of the casing 1, the conductor plate 6 is maintained in electrically conducting position against the reflecting plate 5 (FIG. 1 and FIG. 8).

The rear end 21 of said front conductor plate 6 is projected rearwards from said securing member 19 by a short length to form a fixed terminal of said electrical contactor 8, and is associated electrically with a movable contact described below.

The rear conductor plate 7 is made of electrically conducting metal similar to the front conductor plate 6, its main part is extended along the inner surface of the casing 1, and its rear end 22 is bent substantially at a right angle towards the axis of the casing 1 so as to contact electrically with a spiral-spring 23 of electrically conductive metal inserted into the bottom of the casing 1. A securing member 25, having wedge-like or dovetail sectional shape of same size and of same material as said securing member 19, is secured by an eyelet 24 to the rear conductor 7 ahead of its central portion. Said securing member 25 is inserted into the rear end of said key-way 20, whereby the rear conductor plate 7 is secured in its position. Said rear conductor plate 7 is extended forward from the securing member 25, and in its front end is formed a movable contact 26 operatively associated with the rear end 21 of said front conductor plate 6. Further, a lug 27 is formed outward (on the opposite side of the cells) on said rear conductor plate 7 in a position adjacent to the rear of said contact 26 to carry a permanent magnet 28 cemented therewith on the rear conductor plate 7.

In assembling the water-tight portable electric lamp according to this invention, the rear conductor plate 7 is put into the casing 1 prior to the front conductor plate 6: after the rear conductor plate 7 has been positioned by inserting said securing member 25 into the key-way 20, the front conductor plate 6 is positioned by inserting its securing member 19 into the key-way 20.

Switch operating head 9 comprises: a holding case 30 made of synthetic resin, connected integrally to the cylindrical casing 1 in an outside position corresponding to that of the key-way 20 and provided with an opening 29: an operating member 31 made of synthetic resin and slidable back and forth in said case through the opening 29: and a permanent magnet 34 supported in the inner face of said operating member 31 by two legs 32 pendant from the operating member 31 and a sliding plate 33 having two upward projections 32' engaging with said legs 32.

Figure 9:
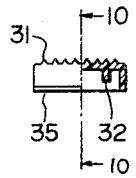
FIG. 9 is a side view of a switch operating member, partly in section.
Figure 10:
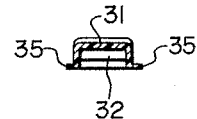
FIG. 10 is a sectional view along the line 10—10 in FIG. 9.
Figure 11:
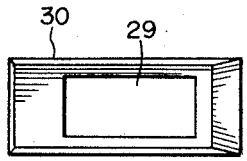
FIG. 11 is a plan view of a holding case.
Figure 12:
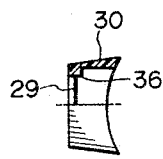
FIG. 12 is a side elevation of FIG. 11, partly in section.

Said operating member 31 is provided with two ribs 35 on both sides along its moving direction (FIG. 9 and FIG. 10) and by engaging said ribs with shoulders 36 formed in both inner faces of the holding case 30, said member 31 is guided in its sliding movement. The sliding plate 33 is provided on its front and back ends with an elastic edge 37, respectively, while the cylindrical casing 1 is provided with a rib 38 on its outer surface in the front and rear position of said elastic edges 37 respectively, and by engaging the front elastic edge 37 with the front rib 38, or the back elastic edge with the back rib, in an advanced or retracted position of the operating member 31 and accordingly of the sliding plate 33, the operating member 31 is elastically held in its traveled end position.

Figure 13:
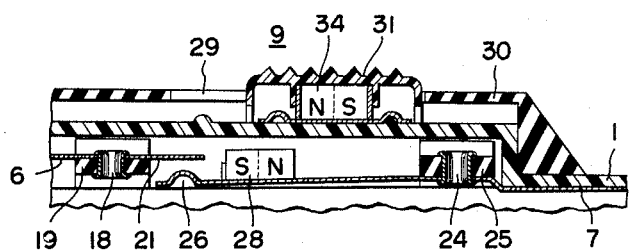
FIGS. 13 and 14 are enlarged partial longitudinal sectional views illustrating the magnetic switch in the open and closed positions, respectively between two permanent magnets.
Figure 14:
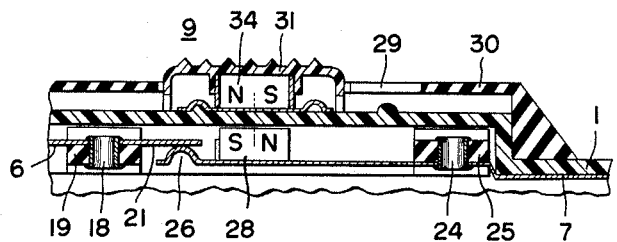

FIGS. 13 and 14 show the relative arrangement and operation between the two permanent magnets: the permanent magnets 28 and 34 are orientated with their N and S poles in opposite direction along the traveling path of the permanent magnet 34, that is, the N pole of the magnet 28 is orientated rearwards, while the N pole of the magnet 34 forwards. Besides, the two permanent magnets are so arranged relatively as to have some magnetic repelling force between them in the retracted position of the permanent magnet 34 shown in FIG. 13. Therefore, in the retracted position of the permanent magnet 34, the movable contact 26 of the conductor plate 7 carrying the permanent magnet 28 is spaced from the fixed terminal 21, whereby the switch contactor is maintained in open state. The two permanent magnets 34 and 28, however, are superposed when the permanent magnet 34 is advanced into the position shown in FIG. 14, producing magnetic attraction strong enough to close the electrical circuit for the lamp bulb 4 by bringing the movable contact 26 in contact with the fixed terminal 21, and while the both permanent magnets 34 and 28 are kept in such superposed relation, the lamp circuit is maintained in closed state.

In the embodiment shown in FIG. 1, a collar 40 of the base 39 of the lamp bulb 4 is contacted with the reflector plate 5 in the periphery of a central opening of said reflector plate. A bottom-closed cylindrical casing 41 made of insulating material is fitted to the base 39, and the reflector plate 5 is connected to said casing 41 by screwing a screw-threaded cylinder 42 mounted to the reflector plate to a screw threaded portion of the outer surface of the casing 41. An electrically conducting eyelet 45 is fixed in the central opening 44 of the bottom of said casing 41, and a spiral spring 47 made of an electrically conducting metal is inserted between the inner face of said eyelet 45 and the tip terminal 46 of the lamp bulb 4 so as to press the collar 40 of said lamp base 39 against said reflector plate 5. Said eyelet is electrically contacted in its outer face with a central terminal of a dry cell 3. A spare lamp-bulb 4S may be supported by a grip 48 mounted on said cylindrical casing 41.

The mounting apparatus for the lamp bulb 4 above described, may be modified in construction, and the grip-mount for the spare lamp-bulb may be eliminated, if desired.

Finally, a part denoted by numeral 49 is an annulet projected from the outside of the bottom of the casing 1, through which a cord can be passed for convenience's sake in use of the portable electric lamp.

From the foregoing it will be seen that many modifications of the specific disclosed form of the invention may be resorted to, and it is to be understood that the scope of the invention is to be ascertained solely by the appended claims.

I claim:

1. A water-tight portable electric lamp comprising, in combination, a water-tight enclosure including a magnetically permeable cylindrical casing having a closed inner end, and a lens assembly disengageably secured in water-tight relation to the open front end of said casing; a metallic reflector positioned adjacent the inner surface of said lens; a lamp socket secured to said reflector and including a central contact; a lamp bulb mounted in said lamp socket and having a central base contact engageable with said central contact; electrically conductive means establishing electric circuit connection between a lateral contact of said lamp bulb and said reflector; a dry cell battery disposed in said cylindrical casing and including one terminal electrically and mechanically engageable with said central contact; an electrically conductive coil spring disposed between the closed rear end of said cylindrical casing and the other terminal of said battery; a switch recess formed in said cylindrical casing and opening toward the interior thereof, the walls of said recess being integral with said cylindrical casing to form part of said water-tight enclosure; a first electrically conductive metal strip extending along said enclosure and mounted on the inner surface thereof, said first electrically conductive strip having a forward end in electrical connection with said reflector and a rear end positioned in said switch recess and constituting a fixed switch contact; a second electrically conductive metal strip extending longitudinally of said enclosure and secured on the inner surface thereof, said second electrically conductive strip having a rear end in electrical connection with said coil spring and a resilient front end extending into said switch recess and in longitudinally overlapping relation with the rear end of said first electrically conductive strip, the front end of said electrically conductive strip normally being spaced from the rear end of said first electrically conductive strip and constituting a movable switch contact; a first permanent magnet mounted on the front end of said second electrically conductive strip; a switch operator mounted for sliding movement on the exterior surface of said enclosure and longitudinally of the outer surface of the outer wall of said switch recess; and a second permanent magnet movable with said switch operator; said permanent magnets extending longitudinally of said enclosure and having relatively reversed respective polar orientations; said operator having a first position in which said magnets are in longitudinally displaced relation with like poles of said magnets being in adjacent relation to repel each other, and a second position wherein said two magnets are substantially laterally aligned with respective poles of opposite polarity being laterally opposite each other; whereby, in said second position, said second permanent magnet will attract said first permanent magnet to move said movable switch contact into engagement with said stationary switch contact to complete a series energizing circuit including said lamp bulb, said battery, said spring, said electrically conductive strips, and said reflector.

2. A water-tight portable electric lamp, as claimed in claim 1, in which the walls defining said switch recess project laterally from said cylindrical casing; and including a switch operating member housing having an outer wall spaced from the outer wall of said switch recess to form a space receiving said second permanent magnet; said switch operator being guided in a slot in the outer wall of said switch operating member housing.

3. A portable, electric lamp, as claimed in claim 1, in which the outer wall of said switch recess is formed with a dovetail groove extending longitudinally thereof; each of said first and second electrically conductive strips having a dovetail slide anchored thereto and inserted into said dovetail groove to mount said electrically conductive strips on the inner surface of said casing.

4. A portable electric lamp, as claimed in claim 2, in which said switch operating member is hollow and opens toward the outer wall of said switch recess; said switch operating member being formed of dielectric material and having positioning formations on its inner surface; and a sliding plate engaged with said positioning formations and retaining said second permanent magnet for conjoint movement with said operating member.

References Cited by the Examiner
UNITED STATES PATENTS

| | | | |
|---|---|---|---|
| 1,644,126 | 10/27 | Harris | 240—10 |
| 2,234,972 | 3/41 | Lennan | 240—10 X |
| 2,431,518 | 11/47 | Stigler et al. | 240—10.66 |
| 2,729,740 | 1/56 | Davis | 240—10.66 |
| 2,734,123 | 2/56 | Gerber | 240—2 |
| 3,025,372 | 3/62 | Benson | 200—87 |
| 3,067,324 | 12/62 | Thompson | 240—10 X |

NORTON ANSHER, *Primary Examiner*.